(12) United States Patent
Bueermann et al.

(10) Patent No.: US 10,356,976 B2
(45) Date of Patent: Jul. 23, 2019

(54) DRIVE ARRANGEMENT FOR DRIVING A CUTTER BAR OF A CUTTING MECHANISM

(71) Applicant: DEERE & COMPANY, Moline, IL (US)

(72) Inventors: Martin Bueermann, Beckingen (DE); Dirk Weichholdt, Woelfling les Sarreguemin (FR); Eric Pellegrini, Sarreguemines (FR); Saravanan Tamilarasan, Zweibrucken (DE); Steve Guthoerl, Merchweiler (DE); Ferdinand Zumbach, Zweibrucken (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/648,607

(22) Filed: Jul. 13, 2017

(65) Prior Publication Data

US 2018/0139897 A1 May 24, 2018

(30) Foreign Application Priority Data

Jul. 12, 2016 (DE) .......................... 10 2016 212 646

(51) Int. Cl.
*A01D 34/135* (2006.01)
*A01D 41/14* (2006.01)
(Continued)

(52) U.S. Cl.
CPC ........... *A01D 34/135* (2013.01); *A01D 34/30* (2013.01); *A01D 34/305* (2013.01); *A01D 34/32* (2013.01); *A01D 41/14* (2013.01); *A01D 34/04* (2013.01)

(58) Field of Classification Search
CPC ...... A01D 34/30; A01D 34/145; A01D 34/02; A01D 34/14; A01D 34/04; A01D 34/13;
(Continued)

(56) References Cited

U.S. PATENT DOCUMENTS

| 712,500 | A | * | 11/1902 | Colwell | ................. A01D 34/02 56/2 |
| 1,351,939 | A | * | 9/1920 | Andre | ................... A01D 34/08 180/19.1 |

(Continued)

FOREIGN PATENT DOCUMENTS

| DE | 2411232 A1 | * | 9/1974 | ........... A01D 34/135 |
| DE | 2444173 A1 | * | 3/1976 | ............. A01D 34/30 |

(Continued)

OTHER PUBLICATIONS

Search Report issued in counterpart application No. EP17180698.7, dated Dec. 5, 2017 (9 pages).

*Primary Examiner* — Arpad Fabian-Kovacs
(74) *Attorney, Agent, or Firm* — Klintworth & Rozenblat IP LLP

(57) ABSTRACT

A drive arrangement for the reciprocating drive of a cutter bar comprises an input element which can be set into a continuous pivoting movement by a drive device, and an output element which is coupled to the cutter bar and is coupled to the input element by a coupling rod. The output element is pivotably connected to a first end of a first lever and of a second lever, which levers, for their part, are pivotably mounted. The levers and the output element are dimensioned in such a manner that the output element essentially only carries out a lateral movement.

7 Claims, 3 Drawing Sheets

(51) Int. Cl.
*A01D 34/32* (2006.01)
*A01D 34/30* (2006.01)
*A01D 34/04* (2006.01)

(58) Field of Classification Search
CPC .... A01D 41/14; A01D 41/142; A01D 34/135; A01D 34/32
See application file for complete search history.

(56) References Cited

U.S. PATENT DOCUMENTS

| | | | | |
|---|---|---|---|---|
| 1,647,867 | A * | 11/1927 | Hutsell | A01D 34/02 33/1 A |
| 3,577,716 | A | 5/1971 | McCarty | |
| 3,941,003 | A * | 3/1976 | Garrison | A01D 34/30 74/44 |
| 3,973,378 | A * | 8/1976 | Bartasevich | A01D 34/37 56/11.9 |
| 4,067,179 | A * | 1/1978 | Schneider | A01D 34/30 56/297 |
| 4,901,512 | A * | 2/1990 | Castoldi | A01D 34/13 56/293 |
| 4,909,025 | A * | 3/1990 | Reissig | A01D 34/305 56/257 |
| 5,497,605 | A | 3/1996 | Underwood et al. | |
| 6,889,492 | B1 * | 5/2005 | Polk | A01D 34/30 56/257 |
| 7,082,742 | B2 | 8/2006 | Schrattenecker | |
| 7,520,118 | B1 * | 4/2009 | Priepke | A01D 34/30 56/257 |
| 7,730,702 | B2 | 6/2010 | Mortier et al. | |
| 7,805,919 | B2 * | 10/2010 | Priepke | A01D 41/142 56/257 |
| 8,011,272 | B1 * | 9/2011 | Bich | A01D 34/305 56/299 |
| 9,357,696 | B2 * | 6/2016 | Ritter | A01D 34/02 |
| 9,622,409 | B2 * | 4/2017 | Coers | A01D 41/14 |
| 9,668,407 | B2 * | 6/2017 | Cook | A01D 34/145 |
| 2006/0089219 | A1 | 4/2006 | Maertens | |
| 2009/0145097 | A1 * | 6/2009 | Priepke | A01D 34/30 56/257 |
| 2009/0145264 | A1 * | 6/2009 | Priepke | A01D 34/30 74/84 R |
| 2011/0099964 | A1 * | 5/2011 | Coers | A01D 41/14 56/296 |
| 2014/0130472 | A1 * | 5/2014 | Cook | A01D 34/30 56/16.4 R |
| 2014/0190139 | A1 * | 7/2014 | Cook | A01D 34/145 56/10.1 |
| 2014/0215991 | A1 * | 8/2014 | Brimeyer | A01D 34/30 56/14.7 |
| 2014/0318094 | A1 * | 10/2014 | Cook | A01D 34/30 56/10.1 |
| 2014/0345239 | A1 * | 11/2014 | Cook | A01D 34/145 56/10.1 |
| 2015/0000237 | A1 * | 1/2015 | Ritter | A01D 34/02 56/10.1 |
| 2015/0163994 | A1 * | 6/2015 | Bich | A01D 34/14 56/299 |
| 2015/0305233 | A1 * | 10/2015 | Surmann | A01D 34/135 56/10.1 |
| 2016/0066503 | A1 * | 3/2016 | Cook | A01D 34/30 56/257 |
| 2016/0174460 | A1 * | 6/2016 | Honey | A01D 34/305 56/181 |
| 2017/0079203 | A1 * | 3/2017 | Vanone | A01D 34/135 |
| 2017/0086368 | A1 * | 3/2017 | Cook | A01D 34/30 |
| 2017/0265383 | A1 * | 9/2017 | Cook | A01D 34/145 |
| 2018/0192582 | A1 * | 7/2018 | Lounder | A01D 34/14 |

FOREIGN PATENT DOCUMENTS

| | | |
|---|---|---|
| DE | 102004037580 A1 | 3/2006 |
| DE | 102010040870 A1 | 5/2011 |
| DE | 102013208957 A1 | 11/2014 |
| EP | 1653122 A1 | 5/2006 |
| EP | 2382852 A2 | 11/2011 |
| EP | 2700294 A2 | 2/2014 |
| EP | 2769610 A1 | 8/2014 |
| FR | 2126807 A5 | 10/1972 |

* cited by examiner

DRIVE ARRANGEMENT FOR DRIVING A CUTTER BAR OF A CUTTING MECHANISM

FIELD OF THE INVENTION

The invention relates to a drive arrangement for the reciprocating drive of a cutter bar which is mounted displaceably in a plane in a lateral direction, with an output element which is coupled to the cutter bar and can be set into a lateral reciprocating motion by a drive device.

BACKGROUND OF THE INVENTION

Cutting mechanisms are used in the harvesting of agriculturally cultivated plants in order to cut the plants, bring them together and feed them to a harvesting machine in which they are processed further, in particular threshed (combine harvester) or chopped (field chopper). Cutting mechanisms of this type generally comprise a front cutter bar in order to cut the plants, a reel which is arranged above the cutter bar, in order to gather the upper parts of the plants to the rear, and a transverse conveyor worm which brings the crop together laterally in order to feed same through a rear opening in a rear wall of the cutting mechanism to a feeder housing of the combine harvester or to feed the crop to a drawing-in channel of the field chopper to produce whole plant silage. Side walls between which the cutter bar and the transverse conveyor worm extend are provided at the lateral ends of the cutting mechanism. The base of the cutting mechanism between the cutter bar and the rear wall is formed by a bottom plate referred to as a cutting table.

For adaptation to different types of crop and therefore plant sizes, cutting mechanisms with length-adjustable cutting tables are used. In particular for harvesting rape, the cutting table is extended forward (and supplemented by side blades), whereas, by contrast, said cutting table is retracted to the rear when harvesting lower plants or plants which unlike rape form a tight bush, such as, for example, wheat.

In particular in the case of cutting mechanisms with length-adjustable cutting tables, but also in the case of cutting mechanisms which are not length-adjustable, the drive of the cutter bar has proven relatively complicated since the driving torque from the combine harvester has to be transmitted entirely to the front to the cutter bar. In the prior art, the drive of the cutter bar customarily takes place by means of a driving belt which is arranged at a lateral end of the cutting mechanism and transfers the driving torque provided by the combine harvester forward to a gearing which, by means of an eccentric drive, converts the rotational movement into a linear reciprocating movement of the cutter bar (cf. DE 10 2004 037 580 A1 for a rigid cutting mechanism or EP 1 653 122 A1 for a cutting mechanism with a length-adjustable table), or the driving belt is replaced by a telescopic propeller shaft (EP 2 700 294 A2).

In the case of cutting mechanism widths of relatively large working widths, it is expedient to divide the cutter bar into two parts which are driven in counter phase in order to eliminate the vibrations caused by the reciprocating movement of the cutter bar. The drive here of the cutter bar halves of each end of the cutting mechanism can take place here by means of an associated gearing, the outputs of which are phase-displaced in relation to each other by 180° (U.S. Pat. No. 3,577,716 A), or, starting from the center of the cutting mechanism, by means of a gearing with a crankshaft which drives two phase-offset outputs (U.S. Pat. No. 5,497,605 A). Other drives arranged in the center of the cutting mechanism use eccentric drives driven via planetary gearings for converting the rotational movement of a hydraulic motor into the lateral movement of the cutter bar halves (EP 2 382 852 A2), or a gearing which is arranged on the rear wall of the cutting mechanism and converts the incoming rotational movement into a linear movement of a drive rod, said linear movement being directed forward and rearward in an alternating manner and being converted into a lateral movement by single-part angle levers (cf. DE 10 2010 040 870 A1 which is considered as forming the generic type).

In particular (but not only) in the case of cutting mechanisms with length-adjustable cutting tables, in the center of the cutting mechanism only a relatively limited vertical space is available in which a gearing for converting the incoming rotational movement into a lateral movement of the cutter bar halves can be installed. However, the crankshaft of U.S. Pat. No. 5,497,605 A requires a relatively large vertical construction space, and this is also true for the combined planetary and eccentric drives arranged one above the other of EP 2 382 852 A2, while the arrangement according to DE 10 2010 040 870 A1 has the disadvantage that the coupling points at which the cutter bar halves are attached to the angle levers not only move to the side, but also to a certain extent forward and rearward since they pivot to and fro about the rotational axes of the angle levers. This movement forward and rearward requires an undesirable wear-promoting play in the bearings for the lateral guidance of the cutter bars. If the mentioned cutter bar movement taking place forward and rearward is intended to be limited, the angle levers have to have a very long design, which makes the drive relatively large and heavy.

An object of the invention is to provide a drive arrangement for driving a cutter bar with gearing for converting the incoming rotational movement into a lateral movement of the cutter bar which is thin in the vertical direction and also does not have the disadvantages mentioned with regard to DE 10 2010 040 870 A1, or has said disadvantages to a lesser extent.

SUMMARY

A drive arrangement for the reciprocating drive of a cutter bar which extends in a plane in which said cutter bar is mounted displaceably in a lateral direction comprises an output element which is coupled to the cutter bar and can be set into a lateral reciprocating movement by a drive device. The output element is in each case pivotably connected to a first end of a first lever and to a first end of a second lever, which levers are in each case mounted pivotably at their second end. The levers and the output element are dimensioned in such a manner that the output element essentially only carries out a lateral movement.

In other words, a driven output element which is coupled to the cutter bar and moves in a reciprocating manner in the lateral direction during operation is supported by two levers in such a manner that said output element can at least approximately only move laterally during a movement by the coupling rod. In particular, the levers together with the output element can form an approximate Roberts straight-line mechanism. This has the effect that the output element carries out an almost perfect linear movement with simple and mechanical means of very thin construction.

The drive of the output element can be a linear drive (e.g. hydraulic cylinder) which acts directly on the output element. In another embodiment, an input element can be mounted pivotably about a first axis and can be set into a continuous pivoting movement about the first axis by means of a drive and can be coupled to the output element by a coupling rod. The continuous pivoting movement can be produced in a manner known per se by an eccentric drive which is driven in a rotational manner on the input side.

The coupling rod can be coupled to the input element and to the output element at a distance from the first axis about axes extending perpendicular to the plane of the cutter bar.

The first ends of the first lever and the first ends of the second lever can be mounted pivotably on the output element about second axes extending perpendicular to the plane of the cutter bar and can be mounted pivotably about third axes running parallel to the second axes.

The third axes can be arranged offset outward in front of the second axes and laterally in relation to the second axes.

On the front side of the cutting mechanism equipped with the drive arrangement according to the invention, two cutter bars which are driveable in opposite directions to each other by a respective drive arrangement can be arranged offset laterally with respect to each other on the front side. However, it would also be conceivable for the cutting mechanism, in particular in the case of smaller working widths, to be provided only with a single cutter bar and a single drive arrangement. However, said cutting mechanism could analogously also have three, four or more cutter bars which are driven in particular in a phase-offset manner by one drive arrangement each.

In particular, the coupling rod of a first drive arrangement for driving a first cutter bar can be coupled to the input element in front of the first axis, and the coupling rod of a second drive arrangement for driving a second cutter bar can be coupled to the input element rearward of the first axis.

The present drive arrangement is suitable in particular for cutting mechanisms with length-adjustable cutting tables in which a front cutting mechanism part is arranged adjustably in relation to a rearward cutting mechanism part. In the case of such cutting mechanisms, the drive arrangement and the cutter bar are supported on the front cutting mechanism part.

The cutting mechanism can be used on any self-propelling harvesting machines, such as combine harvesters or field choppers.

BRIEF DESCRIPTION OF THE DRAWINGS

An exemplary embodiment of the invention is described in more detail below and is illustrated in the drawings, in which.

DETAILED DESCRIPTION

Figure 1:
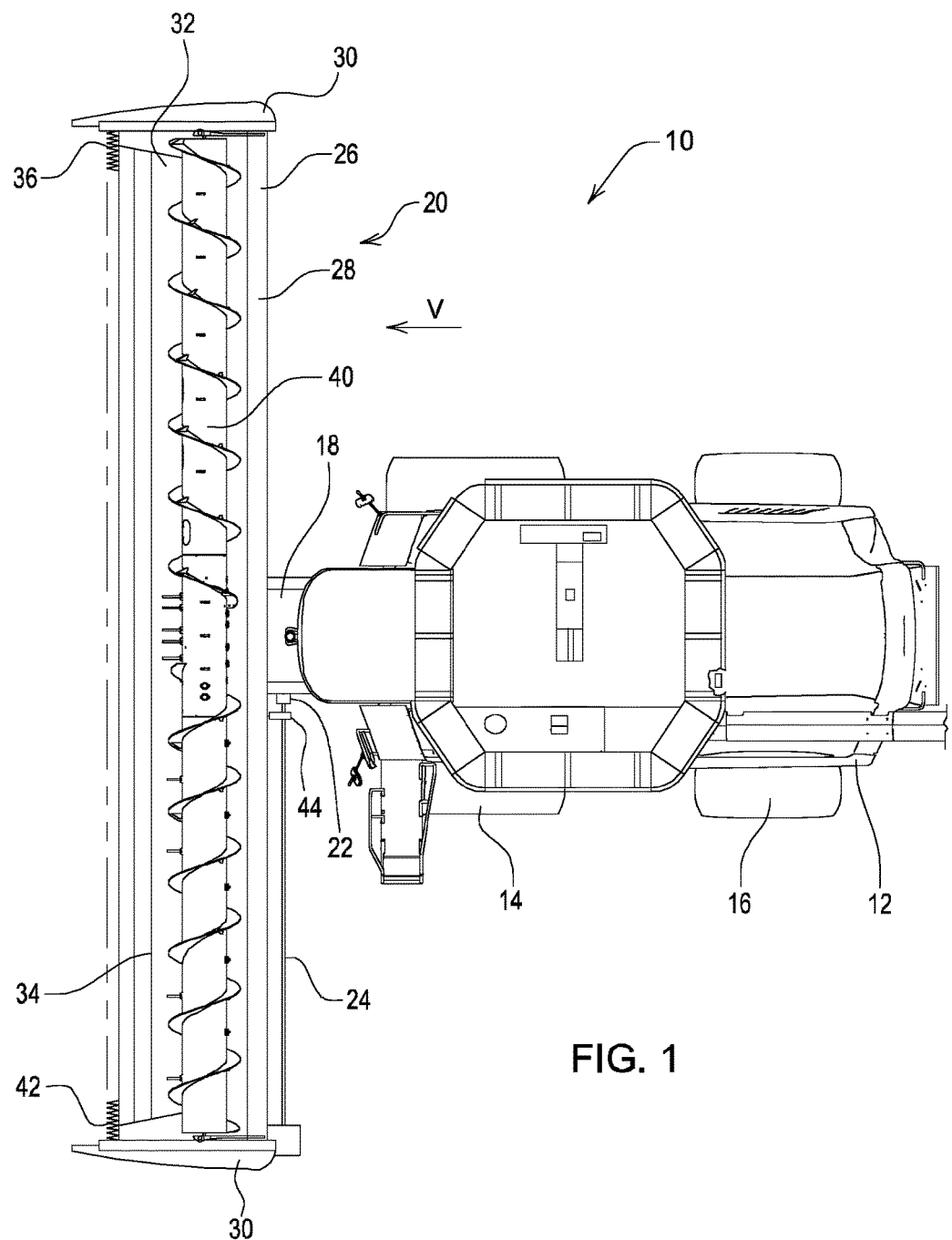
FIG. 1 shows a top view of a combine harvester with a cutting mechanism fastened thereto.

FIG. 1 shows a self-propelled harvesting machine 10 in the form of a combine harvester in a top view. The harvesting machine 10 comprises a body 12 which is supported on driveable front wheels 14 and steerable rear wheels 16 and, in the harvesting mode, is moved over a field in a forward direction V which extends to the left in FIG. 1. At its front end, the body 12 bears a feeder housing 18, to the front end of which in turn a cutting unit 20 is removably attached. The feeder housing 18 has a driven power take-off 22 to which an input shaft 24 for driving driven components of the cutting mechanism 10 is removably connected. In the harvesting mode, the cutting mechanism 20 cuts crop from a field, picks said crop up and feeds it to the feeder housing 18 which conveys said crop into the interior of the body 12 where the crop is threshed, separated and cleaned. Finally, the clean grain is deposited in a grain tank from which the grain can be transferred to a transport vehicle.

The cutting mechanism 20 is extendable and comprises a rearward part 26 with side walls 30 and with a transversely extending frame 28 which is attached to the feeder housing 18, and a front part 32 with a baseplate 34 and two cutter bars 36 and 42, here shown as reciprocating knives. The front part 32 with the baseplate 34 and the cutter bars 36, 42 can be displaced in the forward direction "V" to the rear and front in relation to the rearward part 26 by hydraulic actuators (not shown). The rearward part 26 furthermore comprises a transverse conveyor worm 40 and a reel (not shown). Since adjustment mechanisms of the cutting mechanism are known per se (cf. DE 10 2013 208 957 A1, U.S. Pat. No. 7,082,742 B2 and U.S. Pat. No. 7,730,702 B2), a more detailed discussion is abstained from here.

The drive of the transverse conveyor worm 40 and optionally of the reel takes place via the input shaft 24 which extends transversely on the rear side of the cutting mechanism 20 and extends outward as far as the left side wall 20. Also coupled to the input shaft 24 is a gearing 44 which is arranged adjacent to the power take-off 22 and is driven by the input shaft 24 (which extends through the housing of the gearing 44) and serves for driving the cutter bars 36, 42. The gearing 44 is connected via a telescopic shaft 46 to an angular gearing 48 which, for its part, drives a transverse shaft 50 which, via a further angular gearing (not shown), drives a drive wheel 52 rotating about a central axis 54. The angular gearing 48, the further angular gearing and the drive wheel 52 are attached below the baseplate 34 and are directly or indirectly supported thereon, while the gearing 44 is fastened to the frame 28 of the rearward part 26. The telescopic shaft 46 permits the relative movement between the gearing 44 and the angular gearing 48 that arises during the extension of the cutting mechanism 20. In another embodiment, the drive wheel 52 could also be driven by the gearing 44 via a belt which is guided in a horizontal plane and is kept at a constant tension by two deflecting wheels, even when the cutting mechanism is extended, as is known per se (EP 2 769 610 A1), or an electric or hydraulic motor or hydraulic cylinder is used for this purpose.

The drive wheel 52 which is arranged rotatably about the axis 54 oriented perpendicularly to the plane of the baseplate 34 (and to the plane of the cutter bars 36, 42, in which plane said cutter bars also move in a reciprocating manner laterally) supports a pin 56 which engages in a slot in a fork-shaped element 58 which, for its part, is rigidly connected to an input element (shown here as lever 60) of two drive arrangements for the reciprocating drive of the cutter bars 36, 42, or is produced integrally with said input element. Instead of a slot, the fork-shaped element 58 could also have an elongate hole. It would also be conceivable to mount the input element 60 on the eccentric pin 56 in a rotatable manner about an axis running parallel to the axis 54, and therefore the displacement movement between the fork-shaped element 58 and the pin 56 is omitted, and the input element 60 can be configured to be telescopic or extendable in some other way between the pin 56 and the coupling point of the second coupling rod 62. An eccentric could also be mounted on the pin 56 in a rotatable manner about an axis running parallel to the axis 54 and could connect said eccentric to the input element 60 via a coupling joint. An eccentric could also be mounted on the pin 56 in a rotatable manner about an axis running parallel to the axis 54 and the rotational movement of said eccentric could be transmitted to the input element 60 via a displaceably mounted element. Accordingly, the input element can be set in any desired way into a continuous pivoting movement about the axis 78.

Figure 3:
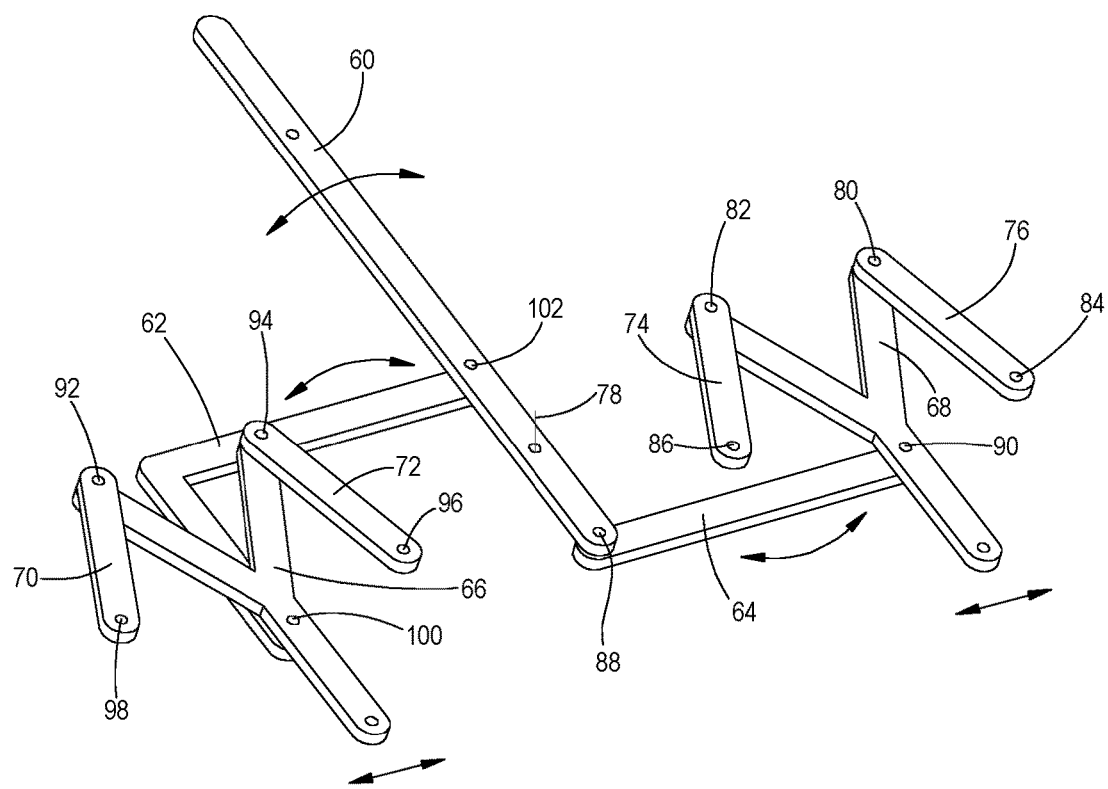
FIG. 3 shows a detailed illustration of the drive arrangements of FIG. 2.

The input element 60 is coupled pivotably in the vicinity of its front end in relation to the baseplate 34 about the first axis 78, which runs parallel to the axis 54, to which end reference is now made to FIG. 3.

A first rectilinear coupling rod 64 is coupled to the front end of the input element 60 pivotably about an axis 88 running parallel to the axis 54 and is coupled to a first output element 68 pivotably about an axis 90 running parallel to the axis 54 (and approximately centrally in the forward direction V), said output element, for its part, being coupled to the left cutter bar 42 pivotably about the vertical axis (or an axis running parallel to the axis 54) or rigidly (directly or via connecting elements arranged inbetween). The coupling rod 64 extends to the left transversely with respect to the forward direction V. A first lever 74 is connected to a rearward end of the Y-shaped output element 68 pivotably about an axis 82 running parallel to the axis 54 and at the other end is mounted pivotably in relation to the baseplate 34 about an axis 86 running parallel to the axis 54. The first lever 74 extends forward and to the right from the axis 82. A second lever 76 is connected to the other rearward end of the output element 68 pivotably about an axis 80 running parallel to the axis 54 and at the other end is mounted pivotably in relation to the baseplate 34 about an axis 84 running parallel to the axis 54. The second lever 76 extends forward and to the left from the axis 80. The two levers 74, 76 are identical in length and are arranged symmetrically with respect to each other about the longitudinal axis of the output element 68.

A second angled coupling rod 62 is coupled to the rear of the axis 78 to the input element 60 pivotably about an axis 102 running parallel to the axis 54 (see FIG. 2) and is coupled pivotably to a second output element 66 about an axis 100 which runs parallel to the axis 54 and is located in the forward direction V at the same height of the axis 90 (and approximately centrally on the output element 66 in the forward direction V), said output element, for its part, being coupled to the right cutter bar 36 pivotably about the vertical axis (or an axis running parallel to the axis 54) or rigidly (directly or indirectly via connecting elements arranged inbetween). The distance between the axes 78 and 102 is preferably identical to the distance between the axes 78 and 88. A third lever 70 is connected to a rearward end of the Y-shaped output element 66 pivotably about an axis 92 running parallel to the axis 54 and at the other end is mounted pivotably in relation to the baseplate 34 about an axis 98 running parallel to the axis 54. A fourth lever 72 is connected to the other rearward end of the output element 66 pivotably about an axis 94 running parallel to the axis 54 and at the other end is mounted pivotably in relation to the baseplate 34 about an axis 96 running parallel to the axis 54.

Figure 2:
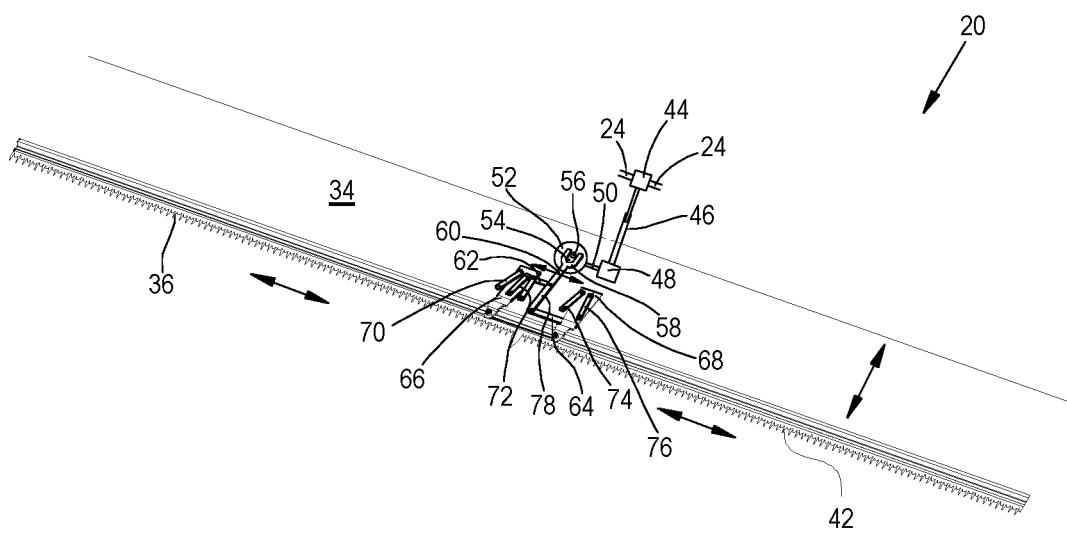
FIG. 2 shows a view of the cutter bars of the cutting mechanism of FIG. 1 together with their drive arrangements.

The axes 54, 78, 84, 86, 96 and 98 can be fastened to the baseplate 34 or to any other holding element which, for its part, is fastened to the front part 32. The axes 88, 102, 90, 82, 80, 94, 92 and 100 connect only two movable components in each case to each other and are not fastened directly to the baseplate 34 or to the mentioned holding element holding the axes 54, 78, 84, 86, 96 and 98. As illustrated in FIG. 2, the output elements 66, 68 can be triangular or, as shown in FIG. 3, Y-shaped. The third lever 70 extends to the front and right from the axis 92. The fourth lever 72 extends to the front and left from the axis 94. The two levers 70, 72 are identical in length and are arranged symmetrically with respect to each other about the longitudinal axis of the output element 66. The drive arrangements are located below the baseplate 34 and can be downwardly protected by means of a covering. The cutter bars 36 and 42 are mounted in a laterally displaceable manner on the front part 42 at a distance from the output elements 66, 68, for which purpose use can be made of linear bearings which are known per se, or further arrangements according to FIG. 3 which, however, are not actively driven.

In light of the foregoing, during operation, the drive wheel 52 rotates about the axis 54, in a manner driven via the power take-off 22, the input shaft 24, the gearing 44, the angular gearing 48 and the further angular gearing which is not shown in FIG. 2. The pin 56 converts the rotational movement, in interaction with the slot in the fork-shaped element 58, into a reciprocating pivoting movement of the input element 60 about the first axis 78. The dimensions of the output elements 66, 68 and of the levers 70 to 76 and the position of the axes 54, 78, 84, 86, 96, 98, 88, 102, 90, 82, 80, 94, 92 and 100 are selected in such a manner that the movement of the output elements 66, 68 over the range of movement which occurs during operation, of the input element 60 takes place (virtually) exclusively in the lateral direction. The coupling rods 62, 64 and the output elements 66, 68 and the levers 70 to 76 therefore form drive arrangements which convert the reciprocating pivoting movement of the input element 60 into a (virtually) pure linear movement of the cutter bars 36, 42 without a great mechanical outlay and with a very flat construction. The central drive also affords the advantage that the side walls of the cutting mechanism can be of a more slender construction because of the omission of the lateral drive of the cutter bar, and contact of the crop with housings arranged at the cutting mechanism ends and losses resulting therefrom are avoided. The transmission ratio and the position for the drive unit can be adapted and optimized via the lever length and geometry of lever 60. The drive arrangements here are designed as what are referred to as a Roberts straight-line mechanism.

The invention claimed is:

1. A drive arrangement for a reciprocating drive of cutter bars which are mounted displaceably in a plane in a lateral direction, with output elements which are coupled to the cutter bars and can be set into a lateral reciprocating movement by a drive device, wherein the output element is in each case pivotably connected to a first end of a first lever and to a first end of a second lever, which levers are in each case pivotably mounted at their second ends, and wherein the levers and the output elements are dimensioned in such a manner that the output elements essentially only carry out a lateral movement, wherein an input element can be set into a continuous pivoting movement about a first axis and is coupled in front of the first axis to a coupling rod for driving one of the cutter bars, and is coupled rearward of the first axis to a coupling rod for driving another of the cutter bars.

2. The drive arrangement as claimed in claim 1, wherein the coupling rods are coupled to the input element and to the output elements at a distance from the first axis about axes extending perpendicular to the plane of the cutter bars.

3. The drive arrangement as claimed in claim 1, wherein the first ends of the first lever and the first ends of the second lever are mounted pivotably on one of the output elements about second axes extending perpendicular to the plane of the cutter bars and the second ends of the first lever and the second ends of the second lever are mounted pivotably about third axes running parallel to the second axes.

4. The drive arrangement as claimed in claim 3, wherein the third axes are arranged offset outward in front of the second axes and laterally in relation to the second axes.

5. A cutting mechanism comprising:
- a frame which is movable over a field in a forward direction;
- a cutter bar mounted on a front side of the frame displaceably in a lateral direction; and
- a drive arrangement with an output element which is coupled to the cutter bar and can be set into a lateral reciprocating movement by a drive device, wherein the output element is in each case pivotably connected to a first end of a first lever and to a first end of a second lever, which levers are in each case pivotably mounted at their second end, and wherein the levers and the output element are dimensioned in such a manner that the output element essentially only carries out a lateral movement;
- wherein two cutter bars which are drivable in opposite directions to each other by a respective drive arrangement are arranged offset laterally with respect to each other on the front side; and
- wherein a coupling rod of a first drive arrangement for driving a first cutter bar is coupled to an input element in front of the first axis, and the coupling rod of a second drive arrangement for driving a second cutter bar is coupled to the input element rearward of the first axis.

6. The cutting mechanism as claimed in claim 5, wherein a front cutting mechanism part is arranged adjustably in relation to a rearward cutting mechanism part, and the drive arrangement and the cutter bar are supported on the front cutting mechanism part.

7. A combine harvester comprising:
- a cutting mechanism, including:
  - a frame which is movable over a field in a forward direction of the harvester;
  - a cutter bar mounted on a front side of the frame displaceably in a lateral direction; and
  - a drive arrangement with an output element which is coupled to the cutter bar and can be set into a lateral reciprocating movement by a drive device, wherein the output element is in each case pivotably connected to a first end of a first lever and to a first end of a second lever, which levers are in each case pivotably mounted at their second end, and wherein the levers and the output element are dimensioned in such a manner that the output element essentially only carries out a lateral movement;
- wherein two cutter bars which are drivable in opposite directions to each other by a respective drive arrangement are arranged offset laterally with respect to each other on the front side; and
- wherein a coupling rod of a first drive arrangement for driving a first cutter bar is coupled to an input element in front of the first axis, and the coupling rod of a second drive arrangement for driving a second cutter bar is coupled to the input element rearward of the first axis.

* * * * *